Feb. 28, 1928.
P. W. HODGKINSON
GRADE CROSSING PROTECTOR
Filed June 28, 1927
1,660,559
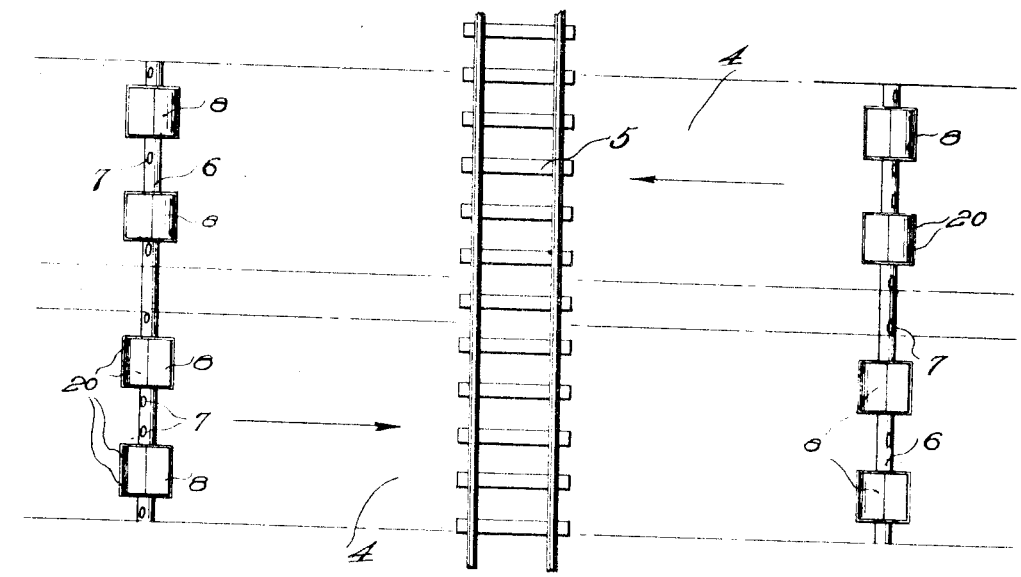
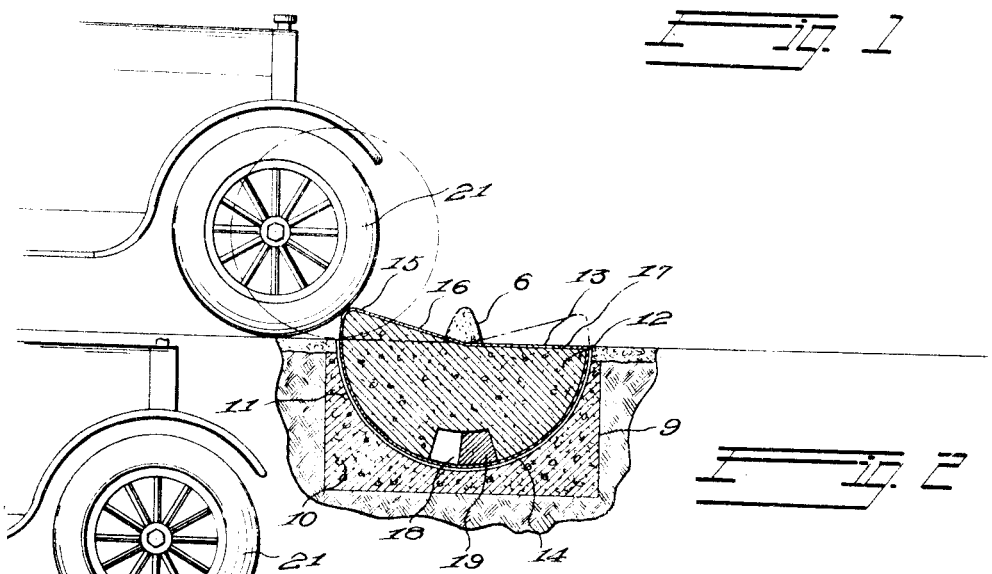
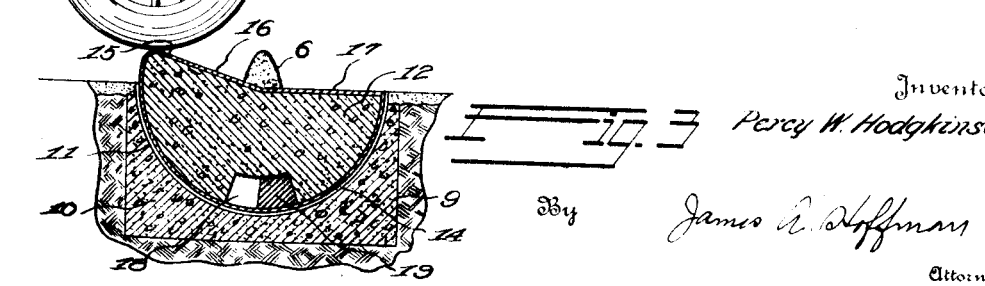
Inventor
Percy W. Hodgkinson
By James R. Hoffman
Attorney Patented Feb. 28, 1928.

1,660,559

UNITED STATES PATENT OFFICE.

PERCY W. HODGKINSON, OF ST. PETERSBURG, FLORIDA.

GRADE-CROSSING PROTECTOR.

Application filed June 28, 1927. Serial No. 202,083.

This invention relates to a device for protecting operators of motor driven or other vehicles from inadvertently or carelessly running upon a dangerous place in the road, such as a railroad or similar crossing.

It is well known that drivers of automobiles, either inadvertently or carelessly, drive upon railroad or similar crossings without assuring themselves that it is safe to do so. As a result, many lives are lost and much property is destroyed. Attempts have been made to meet this situation by legislation requiring vehicles to come to a stop before crossing. These have proved as ineffective as bells, signs, signals, gates, etc., such as have been in everyday use for a long period of time. More recently, it has been proposed to provide obstructions, in the form of ridges across the road adjacent a railroad or similar crossing, to compel the driver of a vehicle to slow up before crossing the railroad. Such obstructions are objectionable because if made high enough to be effective, they require the vehicle to rise and fall as it passes over them, so that even if the operator of the vehicle proceeds slowly, the occupants of the car, as well as the car itself, are subjected to severe shocks. Such obstructions have accordingly not been entirely satisfactory, though they have been generally effective in causing the operators of vehicles to slow up before reaching them and the adjacent danger point in the road.

The primary object of this invention is to provide a projection extending upwardly from the road to prevent passage of a vehicle at high speed, but allowing the vehicle to cross at slow speed without subjecting the car and its occupants to the shocks incident to the passage of a car over a substantial upward projection.

A further object of the invention is to provide a road impediment so formed that it will be caused to yield or be retracted when forces are slowly applied in a downward direction, as by the wheels of a slowly moving vehicle, but which will be comparatively unyielding to sharp blows having a large horizontal component such as caused by a vehicle wheel approaching the impediment at high speed.

A further object of the invention is to provide a construction that will compel the driver of a vehicle to move over a yielding impediment at slow speed, if he would protect his car from injury.

Further objects of the invention will appear as the description of the invention proceeds with reference to the accompanying drawing in which Fig. 1 is a plan view of a crossing and the adjacent sections of the roadway, with the yielding impediments in position, the arrows indicating the normal direction in which the vehicles move across said crossing.

Fig. 2 is an enlarged sectional view of one of the yielding impediments and an elevation of a motor vehicle about to cross it, the position of the vehicle wheel and the impediment after the vehicle has slowly moved thereover being indicated in broken lines.

Fig. 3 is a view similar to Fig. 2 showing the relative position of the impediment and vehicle wheel when it is attempted to cross the impediment at high speed.

Similar reference characters indicate like parts throughout the several views.

In the drawings, numeral 4 indicates the roadway at a dangerous portion thereof, such as a railroad crossing 5. Adjacent said crossing ridges or impediments 6 are provided that extend across the road. Preferably, a plurality of reflecting lenses 7, are set in the ridges or impediments 6. Such lenses may be colored red, and be so designed as to reflect the light projected by the head lights of a vehicle to call attention, after darkness, to the impediment in the road. Ridges 6 may extend completely across the road except in the paths ordinarily traveled by the vehicle wheels. At these points, indicated by numeral 8 on the drawings, suitable recesses 9 are formed in the road. Said recesses may be lined with concrete or other suitable material 10 having a concavity 11 formed therein, said concavity being formed as a surface of revolution so that it will constitute a firm support and bearing for a movable impediment 12.

Preferably, impediment 12 is formed of concrete and may, if desired, be provided with a covering 13 of sheet metal, though such covering may be omitted. Impediment 12 has an under surface constituting a surface of revolution 14 that matches the surface 11. Said impediment is also provided with an upwardly projecting edge 15, that normally extends above the surface of the road. The remainder of the upper surface of the impediment is formed of surfaces 16 and 17 extending at an angle substantially greater than a right angle. An arcuate slot 18 is formed transversely of the impediment 12 and receives a stop piece 19, the ends of which are embedded in concrete 10. Preferably, lenses 20 are set in the corners of impediments 12. Said lenses may be colored green or orange as may be desired and are so positioned that they will reflect the light from the head light of an approaching vehicle toward the operator thereof.

In operation, movable impediments 12 are positioned in the normal paths of the wheels on opposite sides of the point of danger, with projection 15 arranged toward the point from which the vehicle will approach. The lenses 7 and 20 will warn the driver of the approaching car at night, that the road contains an obstruction. In the daytime such obstruction will be plainly visible. If the driver slows down as he approaches projection 15, the wheel 21 of the vehicle will engage the impediment and the weight of the vehicle will overcome the inertia of the comparatively heavy impediment and rotate it to its broken line position, shown in Fig. 2, so that the car will be subjected to no jar whatever. As the wheel moves over the other edge of the impediment, that will be caused to rise when the wheel depresses the edge 15, the impediment is again rotated restoring it to its normal condition with the edge 15 projecting above the road surface.

If a vehicle should attempt to cross impediment 12 at high speed a substantial portion of the blow would tend to bodily move the impediment in the direction of travel of the vehicle, thus increasing the resistance of the impediment to rotation. At the same time, under high speed the downward pressure of the wheel acting for a very short time will be insufficient to overcome the inertia of the heavy impediment or its increased resistance to rotation, and the impediment will not yield, and the arrangement will function as an unyielding impediment after the manner shown in Fig. 3. It will thus be seen that an impediment is provided that can be crossed without substantial jar if the driver of the vehicle proceeds slowly, and that will provide a real obstacle if the driver proceeds thereover at high speed.

The invention may be embodied in other specific forms without departing from the spirit or essential characteristics thereof, and the present embodiment is therefore to be considered in all respects illustrative and not restrictive, the scope of the invention being indicated by the appended claims, rather than by the foregoing description, and all changes which come within the meaning and range of equivalency of the claims are therefore intended to be embraced therein.

What I claim as my invention is:

1. A roadway having a transverse impediment including yieldable portions extending across said roadway in position to warn the operators of vehicles of a dangerous place in the roadway, said yieldable portions of said impediment being arranged in the paths of the wheels of the vehicle and being actuated by them in crossing said portions at slow speed but being unyielding to the wheels of vehicles crossing said portions at high speed.

2. An impediment for a roadway comprising a member set in said roadway, said member having a portion thereof projecting upwardly from the surface of the roadway, said member being yieldably retractable when engaged by the wheels of a slowly moving vehicle and unyielding to said wheels when the vehicle moves at high speed.

3. An impediment for a roadway comprising a relatively heavy movable member set in said roadway with an edge thereof projecting upwardly from the road surface, said member being bodily rockable about an axis transverse to said roadway, said member being so proportioned and arranged that it will be rocked upon its axis to withdraw said edge when the wheels of a vehicle move slowly thereover, but being substantially unyielding to the wheels of a rapidly moving vehicle.

4. A roadway comprising an impediment including yielding portions extending across said road, said portions being arranged in the path of the wheels of a vehicle and being yieldable when said wheels move slowly thereover.

5. The combination defined in claim 4 including distinguishing means on said impediment to indicate to the operator of vehicles on said roadway the yieldable and unyieldable portions of said impediment.

6. A movable impediment designed to be set in a road adjacent a dangerous place comprising a member having a rounded under surface and top surfaces arranged at a substantial angle to each other, and means to limit the rocking movement of said member on said rounded surface when it is placed in a roadway with one of said top surfaces substantially flush with the surface of the road.

7. A roadway comprising an impediment extending transversely thereof, portions of said impediment being yieldable when engaged by the wheels of slowly moving vehicles, each of said portions comprising a rounded member set in the road to rock about an axis extending transversely to the road and having an edge thereof projecting above the road surface, the inertia of said member being such that it will not yield to forces exerted thereon by the wheels of a rapidly moving vehicle.

8. A movable impediment designed to be rotatably mounted in a recess in a roadway, comprising a member having a body that is substantially semi-circular in cross section and having a projection in the form of a sector projecting upwardly from an edge of said body.

In testimony whereof I hereby affix my signature.

PERCY W. HODGKINSON.